(12) United States Patent
Ellis et al.

(10) Patent No.: US 6,709,591 B1
(45) Date of Patent: Mar. 23, 2004

(54) STATIC GRANULAR BED REACTOR

(75) Inventors: Timothy G. Ellis, Ames, IA (US); Kristin F. Mach, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 10/187,523

(22) Filed: Jul. 2, 2002

Related U.S. Application Data

(60) Provisional application No. 60/302,504, filed on Jul. 2, 2001.

(51) Int. Cl.$^7$ .................................................. C02F 3/28
(52) U.S. Cl. ..................... 210/603; 210/617; 210/618; 210/188; 210/258; 210/259
(58) Field of Search ................................ 210/603, 612, 210/617, 618, 631, 252, 258, 259, 188, 416.1

(56) References Cited

U.S. PATENT DOCUMENTS

| | | | | |
|---|---|---|---|---|
| 4,113,612 A | * | 9/1978 | Sekoulov et al. | 210/606 |
| 4,256,573 A | * | 3/1981 | Shimodaira et al. | 210/618 |
| 4,551,250 A | * | 11/1985 | Morper et al. | 210/603 |
| 4,627,917 A | * | 12/1986 | Morper | 210/617 |
| 4,800,021 A | * | 1/1989 | Desbos | 210/605 |
| 5,296,138 A | * | 3/1994 | Walter | 210/274 |
| 5,413,713 A | * | 5/1995 | Day et al. | 210/617 |
| 5,449,453 A | * | 9/1995 | Tang | 210/108 |
| 5,747,311 A | * | 5/1998 | Jewell | 435/176 |
| 5,776,344 A | * | 7/1998 | McCarty et al. | 210/605 |

FOREIGN PATENT DOCUMENTS

| | | | |
|---|---|---|---|
| JP | 62-1498 | * | 1/1987 |
| JP | 3-193196 | * | 8/1991 |

OTHER PUBLICATIONS

David Riggle; Acceptance Improves for Larg–Scale Anaerobic Digestion; New Driving Forces; ISU Research Foundation; Inc.; BioCycle, Jun. 1998.

* cited by examiner

Primary Examiner—Fred G. Prince
(74) Attorney, Agent, or Firm—McKee, Voorhees & Sease, P.L.C.

(57) ABSTRACT

A novel method and apparatus for treating wastewater is described which involves the use of a downflow bioreactor filled with active anaerobic granular biomass. Influent wastewater is evenly distributed across the biomass and passes downward through the granules. The system is simple to use since it does not require the use of mixers, gas/solids/liquid separators, heat exchangers, or other sophisticated equipment. Treated water from the system has a solids content of 30 mg/L or less.

24 Claims, 10 Drawing Sheets

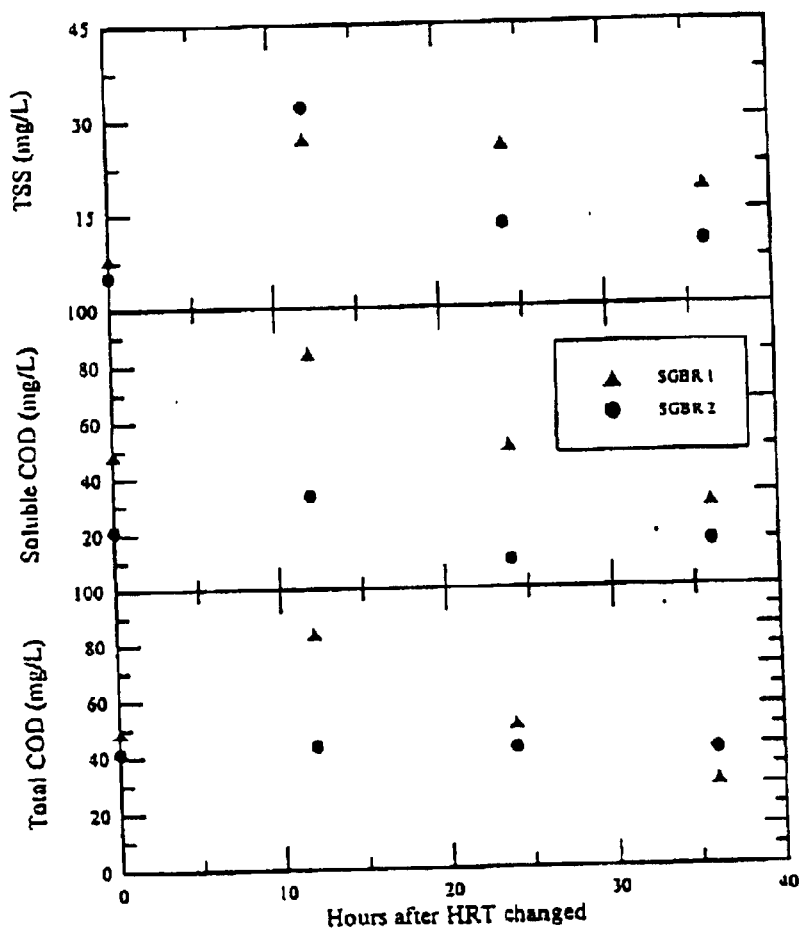
Figure 2. Effluent TSS and COD during transition period from 36 to 5 h HRT

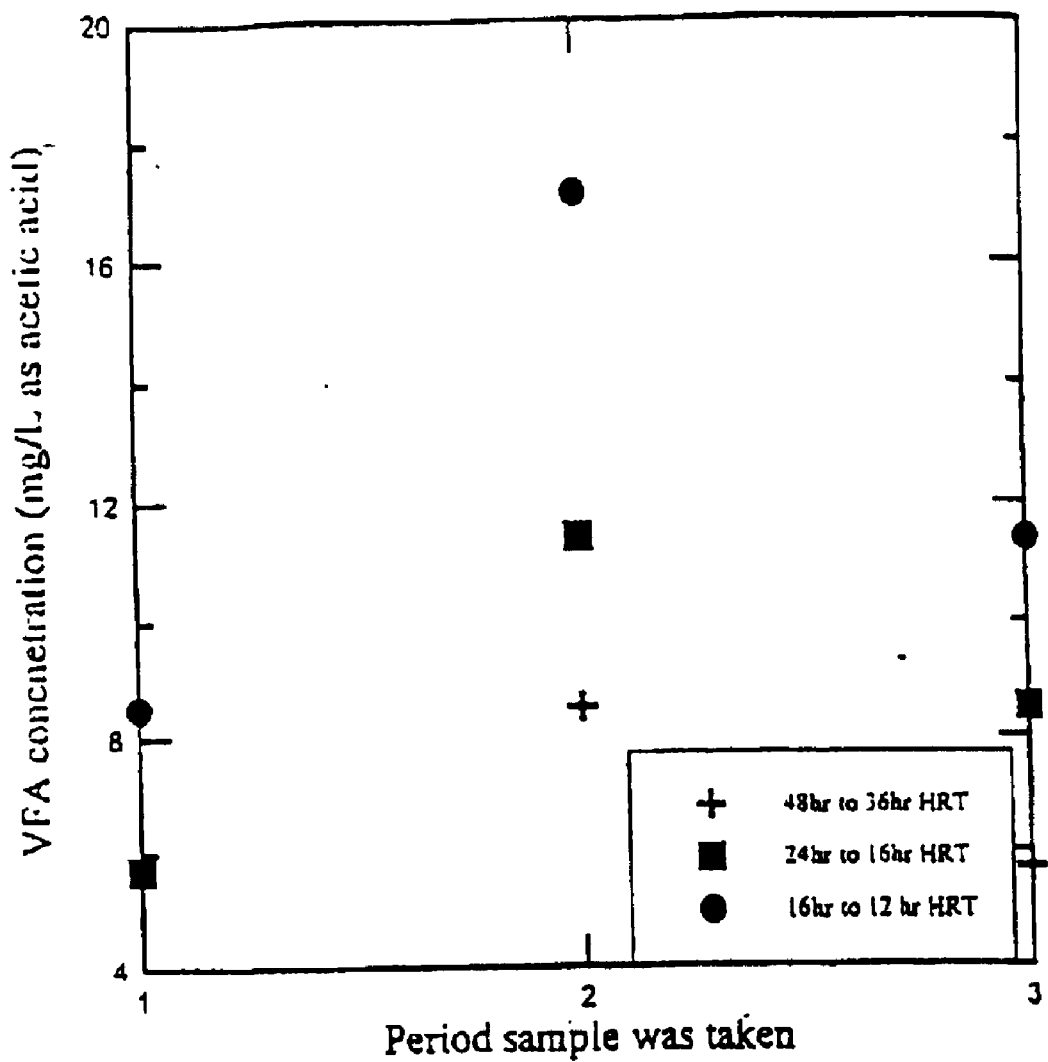
Figure 3. VFA concentration changes in EtSGBR

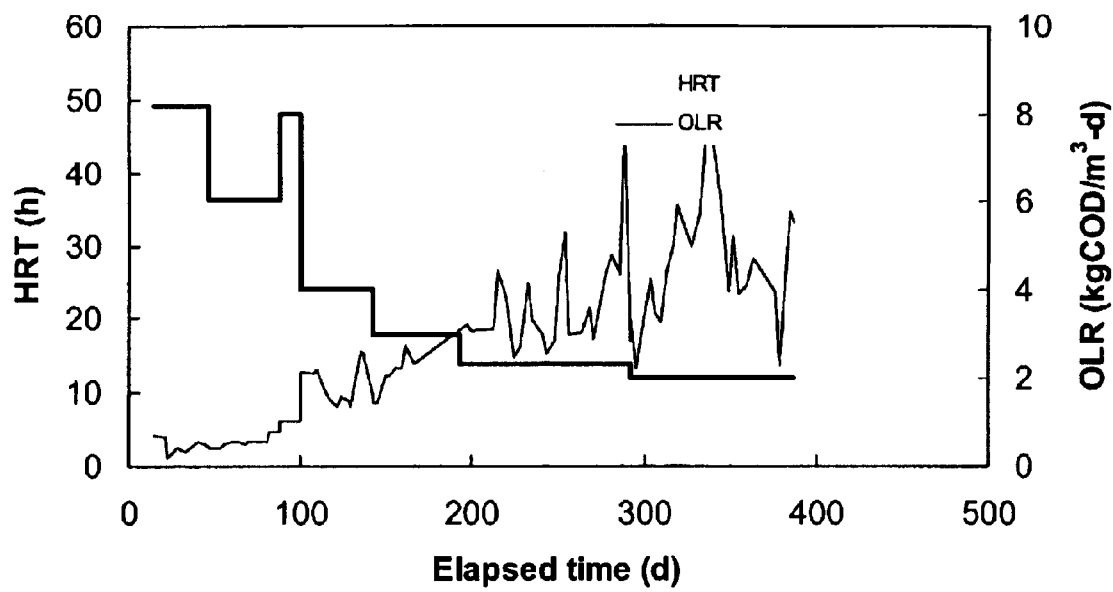
Figure 4. Changes of the hydraulic retention time and organic loading rate.

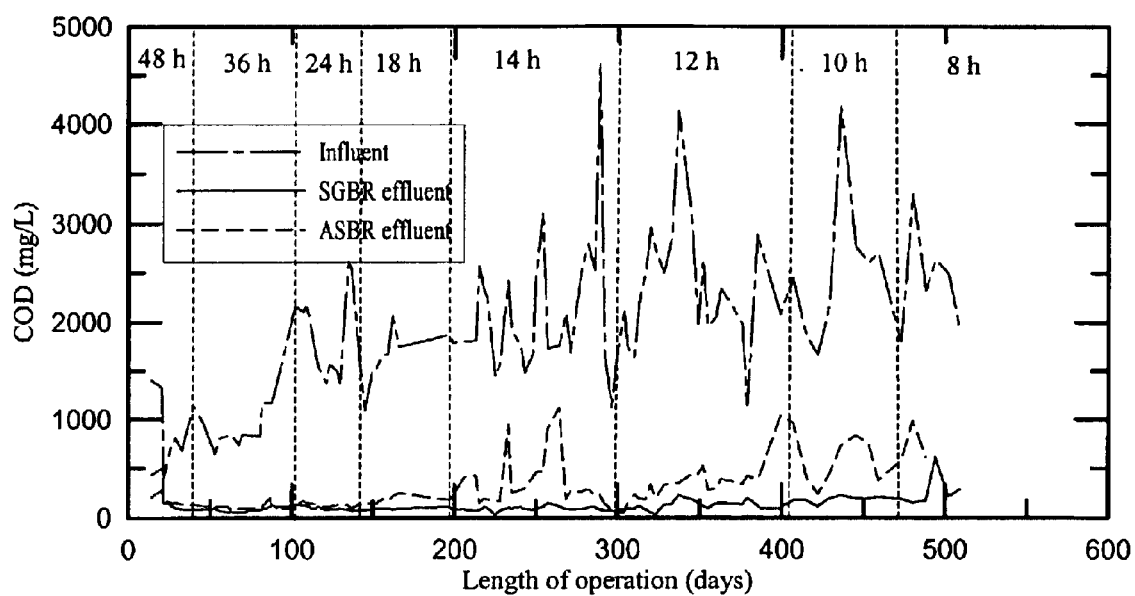
Figure 5. Variation of the COD concentration.

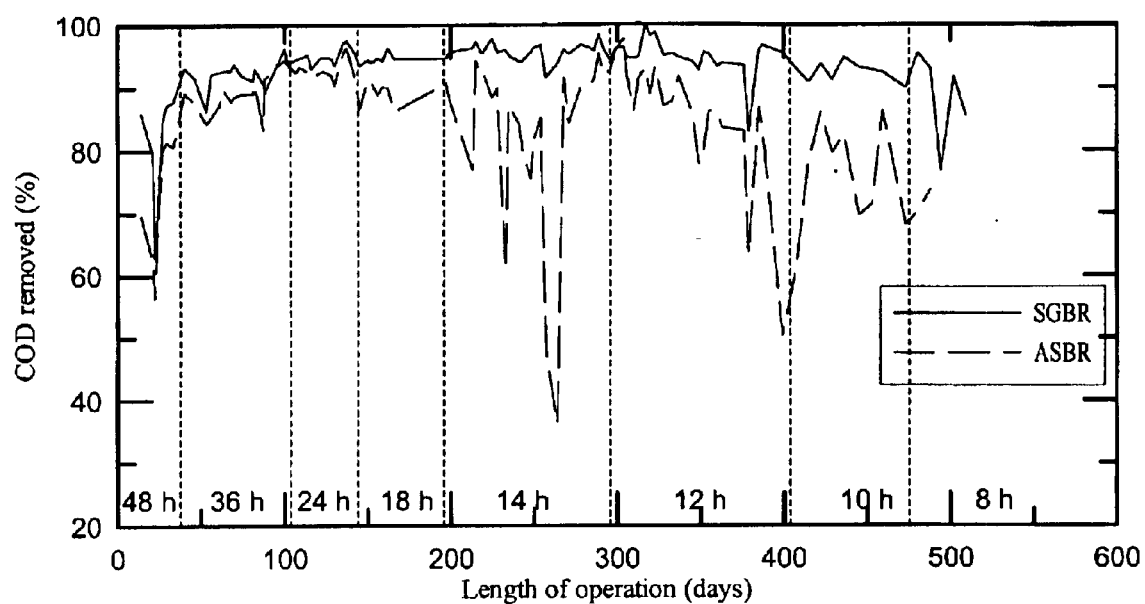
Figure 6. Variation of the COD removal efficiencies.

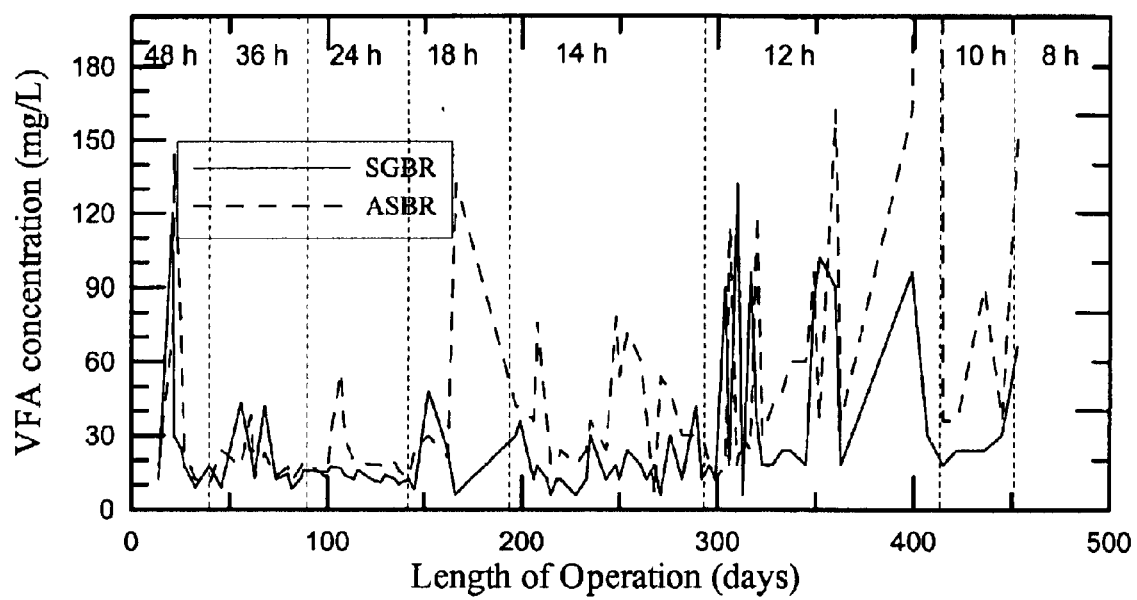
Figure 7. Variation of the VFA concentration.

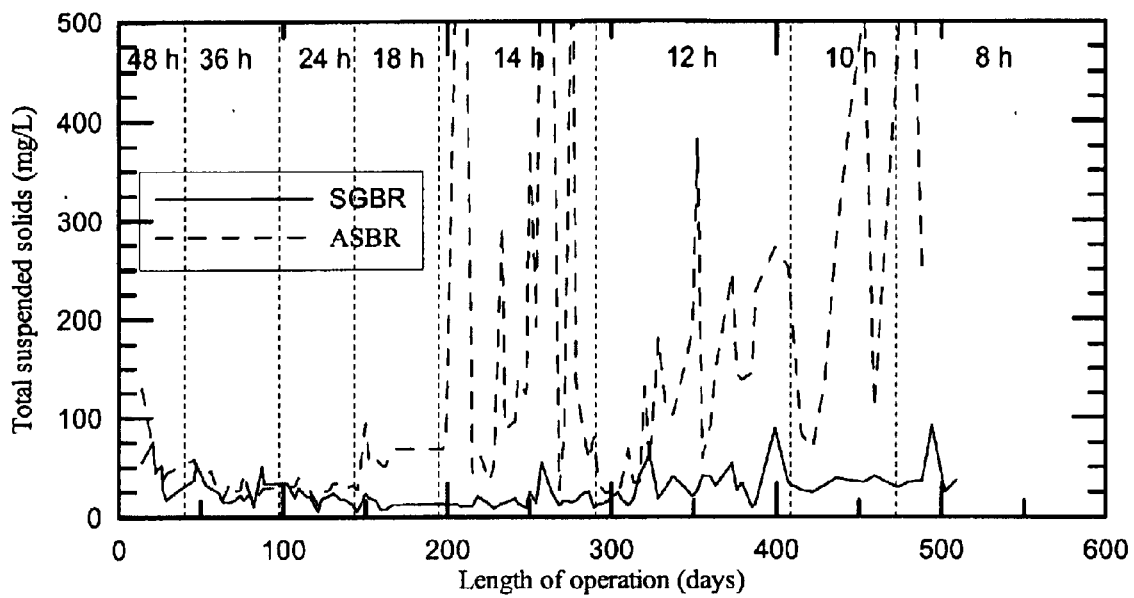
Figure 8. Variation in the effluent SS concentration.

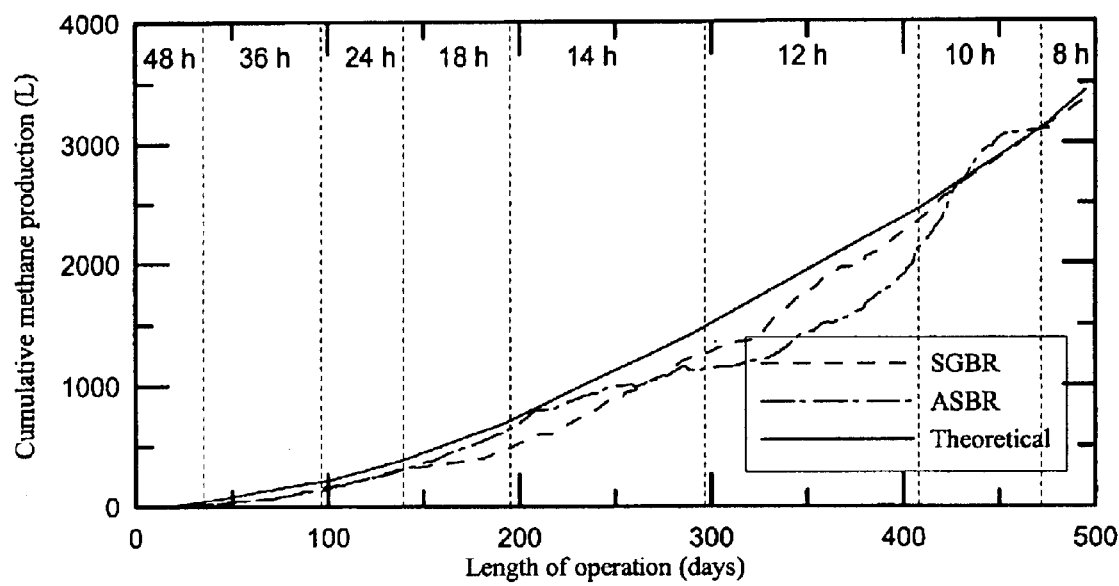
Figure 9. Gas production of the ASBR and SGBR systems.

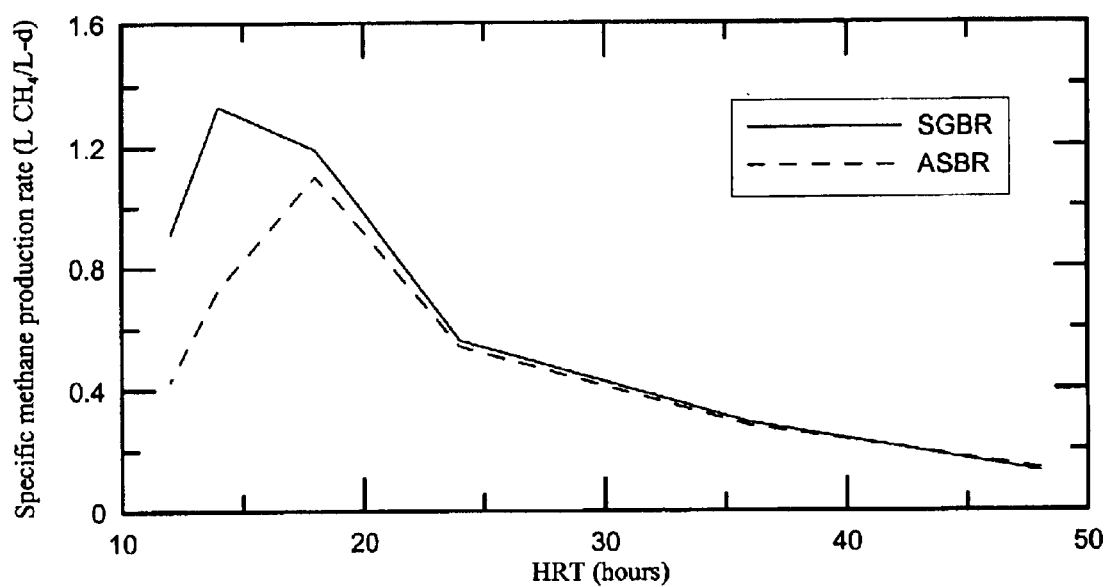
Figure 10. Specific methane production rate

STATIC GRANULAR BED REACTOR

PRIORITY CLAIM

This application claims priority to provisional application U.S. Ser. No. 60/302,504 filed Jul. 2, 2001 now abandoned.

GRANT REFERENCE CLAUSE

This invention was funded in part by the USDA/CREES Contract No. 98-34188-5902. The government may have certain rights in this invention.

FIELD OF THE INVENTION

The invention relates to anaerobic treatment of low to high strength industrial and municipal wastewaters and for polishing the effluent from new and existing anaerobic systems.

BACKGROUND OF THE INVENTION

Wastewater is water used indoors including water that drains from sinks, showers, toilets, washing machines, dishwashers, and any activity that uses water in some way in homes and businesses. Wastewater is typically classified in one of three categories: high strength, medium strength, and low strength. These classifications are usually based on several factors, such as the amount of organic material in the water, measured as biochemical oxygen demand (BOD), the amount of solids "floating" in the sewage, measured as total suspended solids (TSS) or suspended solids (SS), the amount of dissolved oxygen in the wastewater, the acidity/basicity of the wastewater, and the temperature of the wastewater.

Bacterial metabolism that occurs in the absence of oxygen is called anaerobic. Anaerobic microorganisms have played a major role in traditional municipal wastewater treatment through anaerobic digestion, which has been used to degrade organic solids and stabilize waste sludges from activated sludge processes. Over the past several years, anaerobic methods have been increasingly used for industrial pretreatment to remove suspended and soluble organic matter from aqueous streams, especially in high-strength process waters.

Waste waters from chemical, pharmaceutical, pulp and paper, food, dairy, brewery and meatpacking industries are being treated successfully today with a variety of anaerobic treatment systems. Anaerobic processes are normally operated at elevated temperatures (85–95° F.) in the pH range of 6.8 to 7.4, and convert soluble organic carbon into carbon dioxide and methane, in contrast to aerobic systems which only produce carbon dioxide. The methane by-product of anaerobic systems is often used as a fuel to supply heat to the reactor.

Significant disadvantages of aerobic wastewater treatment processes over anaerobic processes are that aerobic processes require large amounts of oxygen and larger volumes for oxygen transfer, making the systems less cost effective. With high temperatures, or a combination of temperatures, anaerobic digestion can produce a high quality effluent, as in the TPAD process (Han et al., 1997[1]) or anaerobic filters operated at thermophilic and mesophilic temperatures (Harris and Dague, 1993[2]).

The use of anaerobic treatment for high-strength wastewater (generally where the chemical oxygen demand (COD) is above 3,000–4,000 mg/l or biological oxygen demand (BOD) is above 1,500 mg/l) eliminates the process limitations and problems associated with high oxygen demand and excessive biomass production that characterize traditional aerobic treatment systems. Another significant advantage of the anaerobic process for treating wastewater is that the anaerobic bacteria may release enzymes that help solubilize the organic solids in the influent, which means that both soluble and suspended BOD can be treated anaerobically.

A significant drawback of anaerobic wastewater treatment systems is that they typically require complex operation and control equipment. For instance, anaerobic systems often require mixing devices, gas or feed recirculation lines, and/or liquids/solids separators. Although necessary, these additional components often lead to operating problems.

Another disadvantage is that effluent from anaerobic processes usually requires costly post-treatment, typically at a municipal treatment facility. In addition to upkeep of the on-site treatment facilities, there is usually a charge for municipal treatment based on BOD, TSS and nutrients (such as phosphorous and nitrogen).

Anaerobic systems are well suited to the treatment of slaughterhouse wastewater. They achieve a high degree of BOD removal at a significantly lower cost than comparable aerobic systems and generate a smaller quantity of highly stabilized, and more easily dewatered, sludge. Furthermore, the methane-rich gas generated can be captured for use as a fuel.

In most countries, anaerobic ponds have been used to achieve a high reduction in BOD, oil, and grease and suspended solids concentrations from the primary-treated slaughterhouse wastewater prior, to subsequent aerobic treatment. Unfortunately, the propensity for odor generation from anaerobic ponds has threatened their continued use in many areas. Consequently, new developments in anaerobic technology during the last several years have been of considerable interest.

The testing of high-rate anaerobic systems has been one of the active areas of research concerning slaughterhouse-waste treatment during the last decade. The 1970s saw the use of low-rate anaerobic digesters to treat slaughterhouse wastewater. These processes were essentially mixed digesters with a BOD loading of between 0.2–4 $kg/m^3$-day, and have proven uneconomic due to their required size. Since this time, a variety of new high-rate anaerobic technologies have been developed to replace the anaerobic pond. Typically, these are characterized as having higher BOD or COD loadings (typically 5–40 kg $COD/m^3$-day) than low-rate systems or anaerobic ponds. This permits a hydraulic retention time in the order of hours, rather than days. The gas generated by the anaerobic activity is methane-rich, but in most cases $H_2S$ is also generated at concentrations from 0.2–0.7% from slaughterhouse wastewater and may need removal.

The NewBio reactor (U.S. Pat. No. 5,616,304) is a downflow, intermittently mixed, sludge blanket anaerobic reactor. This system consists of a covered circular tank and a water transfer/gas handling skid. The reactor includes upper and lower influent mixing blades, sand bed, fluidizing blade, slotted effluent drain, and a methane gas containment/storage area. The effluent from this system, however, requires post-treatment by filtration through a sand bed. This sand filter further has the drawback of causing clogging in the system.

An ideal biological treatment process would be easy to operate and produce a high quality effluent in a relatively small reactor volume. To achieve a high degree of organic removal at short HRTs, many anaerobic processes take advantage of anaerobic bacteria's ability to form a dense agglomeration of particles called granules. Under anaerobic conditions in the reactor, organics from the wastewater are used by different types of microorganisms as the source of energy for the biological degradation process. These organisms tend to agglomerate into flocs, referred to as sludge. Under certain circumstances, the bacteria form small roundish pellets, called granules that consist mainly of methanogenic bacteria. The sludge produces gas as a by-product of the degradation process. A small amount of the food is transformed into either free energy and water or cellular material, which is equal to the new growth of bacteria. However, a large amount of the food is transferred into gas, which consists mainly of valuable methane and carbon dioxide. The Anaerobic Sequencing Batch Reactor (ASBR), Upflow Anaerobic Sludge Blanket (UASB), Anaerobic Migrating Blanket Reactor (AMBR), and other systems produce microbial granules during normal operation.

The formation of granules has been observed in many studies. Hulshoff Pol et al. (1983[3]) found that most granules need an inert support structure to form upon, giving the organisms a building block. Others have noted that organisms adhere to other organisms forming the structure base. Usually, additional pressure is needed to force the organisms together, such as the velocity force from an upflow reactor. However, there is a selective mechanism which determines which groups will stay and which will be washed out in the process.

Granule formation is not limited to anaerobic organisms. However, most research has focused on anaerobic granules. The internal structure of the granule may vary depending on the type of substrate being degraded. Some granules contain layers created by different species of organisms working in a symbiotic relationship. Non-carbohydrate feed sources have been shown to produce homogenous, non-layered granules. Sucrose, brewery, and other wastewaters produce a visibly organized and layered structure because of the methanogenic conversion steps involved. In most anaerobic granules, the outer layer usually breaks down complex substrates into volatile fatty acids, which are then broken down to acetate and methane deeper into the granule. A wide consortia of organisms can be found on the surface of the granule. It has also been observed that filametous Methanothrix may be critical in the critical in the granulation process, possibly to hold the organisms together. Because of the array of organisms in close proximity and their interaction with each other, granules seem to have a high conversion rate and are easily adaptable to different substrates.

Several studies have shown the diverse microbial communities within the anaerobic granules. Because of this diversity, the granules are suitable for low strength wastewater, requiring shorter acclimation periods.

Several studies have been performed on low strength wastewater. Orozco (1996[4]) achieved an optimum of 92% COD removal using an anaerobic plug flow reactor with an 11 hour HRT and operated at 13 to 17° C. with synthetic wastewater. Ndon and Dague (1997[5]) examined the performance of an anaerobic sequencing batch reactor (ASBR) at different HRTs and operating temperatures. With a substrate concentration of 1000 mg COD/L and HRTs of 24 and 12 hours, the soluble COD removal was 93 and 81%, respectively, while operating at 35° C. Dague et al. (1998[6]) used an ASBR to treat synthetic wastewater at low temperatures. The ASBR attained 90% COD removal or better for a feed strength of 600 mg COD/L at 20° C. at HRTs greater than 8 hours. Collins et al. (1998[7]) treated primary clarifier effluent with an expanded granular bed reactor (EGBR) and achieved greater than 90% COD removal at 20° C. This system also had very low VFA concentrations.

The present inventors have now discovered an innovative new anaerobic process for treating low to high strength wastewater. The system is simple to operate and, in contrast to currently available anaerobic systems, does not require the use of mixers or support materials. The effluent from this novel system is low in COD, suspended solids, and volatile acids, which may allow it to be discharged to surface water without additional treatment.

It is therefore a primary objective of the present invention to provide an improved method of treating wastewater that achieves a high conversion of organics and pollutants.

It is another objective of the present invention to provide an improved method of treating wastewater that achieves high microbial biomass density, resulting in low concentrations of organic constituents leaving the reactor.

It is a further objective of the present invention to provide an improved method of treating wastewater that achieves high conversion of organics and pollutants and a faster rate than currently available methods.

It is still a further objective of the present invention to provide an improved method of treating wastewater that requires minimal equipment.

It is yet a further objective of the present invention to provide an improved method of treating wastewater that does not require mixers or solids/liquid separators.

It is a further objective of the present invention to provide an improved method of treating wastewater that does not require support material.

It is a further objective of the present invention to provide an improved method of treating wastewater that may be conducted at ambient temperatures.

It is a further objective of the present invention to provide an improved method of treating wastewater that utilizes a smaller constructed volume.

It is still a further objective of the present invention to provide an improved method of treating wastewater that is more economical to operate than previous methods.

It is still a further objective of the present invention to provide an improved method of treating wastewater that requires little upkeep for operation.

These and other objectives will become apparent from the following description.

SUMMARY OF THE INVENTION

The present invention relates to a method of treating low to high strength wastewater using a static granular bed reactor (SGBR). The SGBR is a high rate anaerobic treatment system that is capable of maintaining high solids retention times despite changes in hydraulic retention times. In addition, the SGBR can achieve a high level of organic removal and produce valuable methane gas from the wastewater.

The SGBR includes a fixed bed of anaerobic granules in a downflow configuration without flow recirculation. The resulting high granule density optimizes the contact between the microorganisms on the granule surface and the wastewater, which achieves a high conversion of organics and pollutants in a shorter time period. This results in smaller constructed volume, lower costs, and greater production of renewable energy in the form of biogas.

The configuration of the SGBR is simple, yet extremely effective. The only mechanical equipment required for its operation is an apparatus for feeding the wastewater into the reactor, such as a feed pump, and an optional auxiliary pump for occasional backwashing using the produced biogas. The SGBR uses a downflow bioreactor that is filled with active anaerobic granular biomass. Influent wastewater is distributed evenly across the bioreactor and passes downward through the granules. The gas that is produced by the granules provides channelization of the bed to prevent clogging. Clogging may also be prevented by recirculation of the gas or effluent to dislodge any trapped granules.

In contrast to previous wastewater treatment systems, the SGBR is simple to use since no extra equipment, such as mixers, sophisticated gas/solids/liquid separators, and heat exchangers are required. Its downflow configuration conserves biomass since it prevents washing out of the biomass. In addition, the SGBR does not require recycle pumping. Effluent from the SGBR is low in COD, suspended solids, and volatile acids concentrations, thereby eliminating the need for further treatment before surface discharge. The effluent may potentially be used as a non-potable water source for many industrial uses.

BRIEF DESCRIPTION OF THE DRAWINGS

FIG. 2 is a graph showing the effluent TSS and COD of SGBR 1 and SGBR 2 during the transition period from 36 to 5 h HRT, as described in Example 2.

FIG. 3 is a graph comparing the changes in VFA concentrations of a SGBR treating ethanol wastewater at steady state (week 0), to transition period (week 1) and new steady state (week 2), as described in Example 2.

FIG. 4 is a graph illustrating the changes of the hydraulic retention time and organic loading rate of the SGBR, as described in Example 3.

FIG. 5 is a graph illustrating the variation of COD concentrations of the SGBR and ASBR influent and effluents, as described in Example 3.

FIG. 6 is a graph illustrating the variation of the SGBR and ASBR COD removal efficiencies, as described in Example 3.

FIG. 7 is a graph illustrating the variation of the VFA concentration of the SGBR and ASBR influent and effluents, as described in Example 3.

FIG. 8 is a graph illustrating the variation of SS concentration of the SGBR and ASBR influent and effluents, as described in Example 3.

FIG. 9 is a graph illustrating the cumulative gas production of the ASBR and SGBR systems at 35° C., as described in Example 3.

FIG. 10 is a graph illustrating the specific methane production rate of the ASBR and SGBR systems, as described in Example 3.

DETAILED DESCRIPTION OF THE PREFERRED EMBODIMENT

Figure 1:
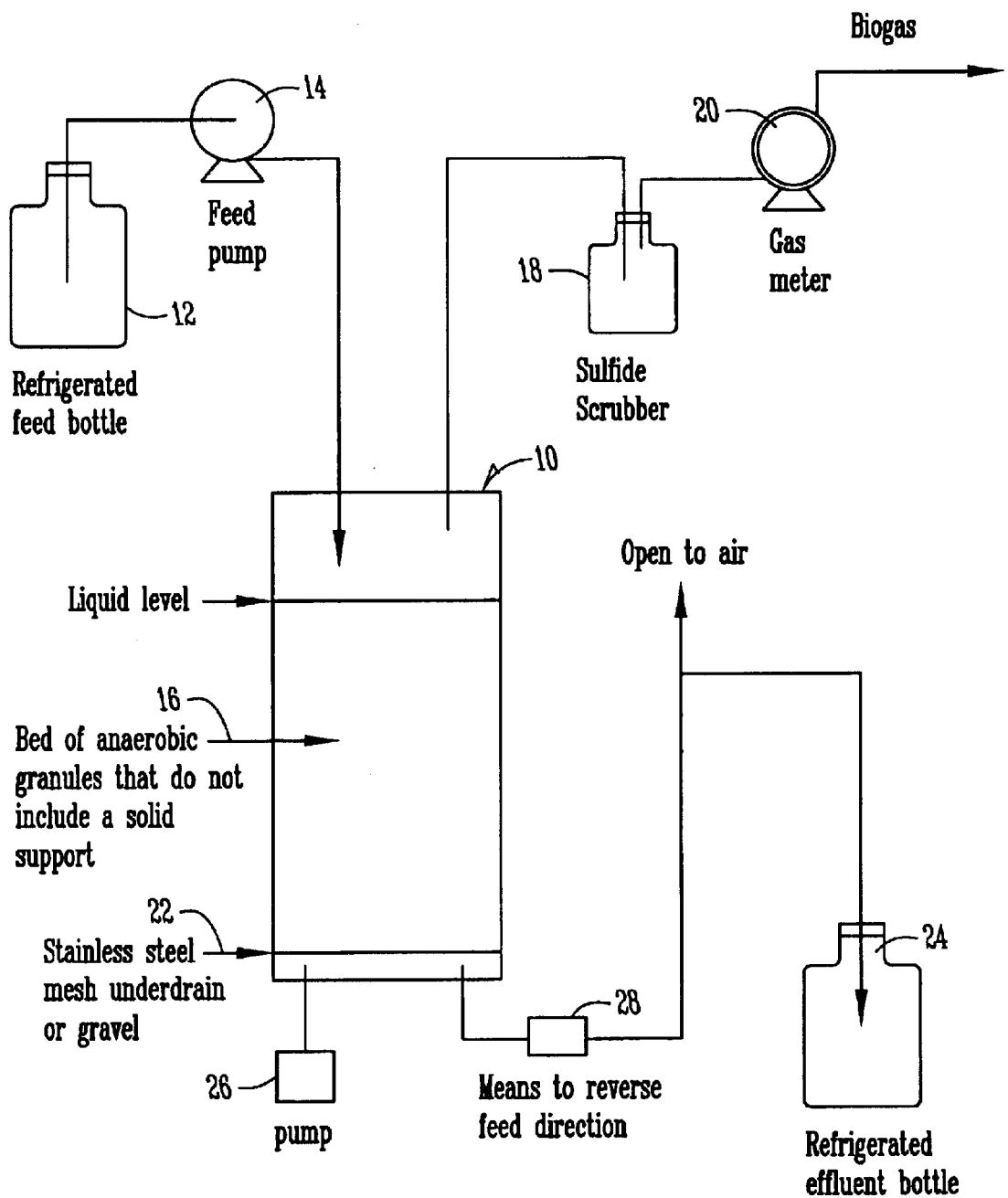
FIG. 1 is a schematic illustration of a preferred embodiment of the SGBR constructed in accordance with the principles of the present invention.

As set forth above, the present invention discloses a novel anaerobic system for treating low to high strength wastewater. Anaerobic digestion of low to high strength wastewater requires the use of a high rate system such as an upflow anaerobic sludge blanket (UASB) reactor, an anaerobic sequencing batch reactor (ASBR), or a suspended growth (e.g., anaerobic contact) or attached growth (e.g., anaerobic filter) system. With any high rate system, care must be taken not to wash out the biomass during hydraulic or organic loading rate changes. The static granular bed reactor (SGBR) has now been shown to be highly effective in removing organics from low to high strength wastewater.

The SGBR is a downflow reactor without flow recirculation to maximize the density and retention of active anaerobic granular biomass. The resulting high granule density optimizes the contact between the microorganisms and the wastewater, and maintains long SRT (81 to 300 d) relatively independent of the hydraulic retention time and organic loading rate.

The SGBR has a unique configuration with minimal equipment needed for operation. Specifically, the SGBR does not require the use of mixers, sophisticated gas/solids/liquid separators, and heat exchangers. Its downflow configuration conserves biomass because the biomass is not washed out. In addition, recycle pumping is not required as it is in an upflow reactor. It has also been surprisingly found that it is not necessary to utilize the velocity force created from an upflow configuration to provide sufficient adherence of the organisms in a structure base.

The SGBR requires little upkeep and therefore minimal training for operation. The infrequent clogging problems are quickly resolved by reversing the feed direction or bubbling off-gas through the granule bed. The start-up time of the reactor is also very short since it is not necessary to allow extra time for the organisms in the granules to grow. Thus, the SGBR begins producing methane and removing organics from the wastewater within days, instead of weeks as is the case with currently available anaerobic wastewater treatment systems.

In addition to its simple operation, the SGBR occupies a small volume compared to other processes. This can be attributed to the high biomass concentration of the granules. The compact reactor size is useful when adding the SGBR to an existing facility with limited land area. Further, the smaller reactor volume results in lower capital costs.

Another advantage of the SGBR is its bed of active granules. Anaerobic filters use packing material or some other support structure for the attachment of the biomass. Howerton and Young (1987[8]) operated two anaerobic filters in series at 30° C. At an organic loading rate (OLR) of 4 kg $m^{-3}d^{-1}$ for the system, a peak efficiency of 98% COD removal was achieved for the two filters. The effluent from the second filter contained less than 90 mg COD/L and suspended solids less than 90 mg/L. One disadvantage of this set-up is limiting the growth of the biomass particles to space available on the support media. Once the media is full, the biomass must grow on top of itself. The SGBR is not limiting in the growth of biomass. Because of the granule bed, the organisms can grow, unrestricted, in any direction.

Scanning electron microscopy has shown various microbes present in and around the active granules of the present invention. Granules from the operating SGBR show significant morphology chances from granules obtained from the original UASB source. In addition to morphology changes, spirochetes and diatoms are easily identified from the SEM results.

Particle size analysis has demonstrated that the granules of the SGBR increase in volume, and size analysis confirms the change in granule structure. At the beginning of the study, the majority (60%) of the granules ranged in size from 0.7 to 1 mm in diameter. Eight months later, 89% of the granules measured greater than 1.0 mm in diameter. The granule growth observed in the SGBR benefits reactor performance by increasing the number of organisms present.

COD and $BOD_5$ results confirm that the SGBR has high organic removal from wastewater. COD balance confirms that the majority of the COD is converted to methane, indicative effective organic conversion. The effluent produced is low in suspended solids and VFAs. In fact, it has been found effluent from the SGBR meets NDPES permitting requirements for $BOD_5$ and SS levels (30 mg/L for both conditions). The effluent may therefore be used as a non-potable water source for many industrial uses.

In the event that suspended solids concentration is not a concern, however, the SGBR may be operated at higher organic loading rates whereby the effluent may not necessarily achieve $BOD_5$ and SS levels of 30 mg/L or less. Instead, the $BOD_5$ and SS levels could generally range from about 50–60 mg/L, for example.

The SGBR's high quality effluent may be attributed to the high solids retention time (SRT). Ideally, when the SRT is maximized, high organic stabilization in the effluent is reported. The SGBR has an approximate SRT of 500 days at a 6 hour HRT, which is much higher than other anaerobic systems. It is expected that during longer HRTs, the SGBR's SRT should increase, creating an even higher quality effluent.

The SGBR may be used to treat any wastewater containing organic, biodegradable solids. Typical sources of such wastewater include chemical, pharmaceutical, pulp and paper, food, dairy, brewery and meatpacking industries. The SGBR is effective in treating low, medium, and high strength wastewater having a COD up to, and possibly greater than 10,000 mg/L. Unlike other anaerobic treatment systems, it is not necessary to combine the wastewater entering the SGBR with additional liquid to decrease the amount of total solids. However, the wastewater may be diluted prior to treatment if desired.

Influent wastewater is fed into the bioreactor using a pump or other conventional means, and is distributed evenly across the active anaerobic granular biomass. The feed rate may vary, and depends primarily upon the flow rate from the wastewater source. The biogranules used in the SGBR are known in the art, and may be obtained from a variety of sources. Preferably, the biogranules are obtained or purchased from UASB systems, and most preferably from efficient UASB systems used to treat comparable waste sources. The biogranules should comprise roughly 70–100% of the liquid level contained in the SGBR. The set-up of the reactor should allow sufficient "headspace" above the biogranules to accommodate granule growth and gas collection.

The processing temperature of the SGBR may generally range from 10–70° C., with about 30—37° C. being preferred. Ambient temperatures are preferred for purposes of cost and convenience. The processing pH is not critical, except to the extent that acidic wastewater is preferably neutralized prior to processing with any industrial bases used in the art, such as lime or sodium hydroxide.

Hydrolytic bacteria contained in the biogranules work in concert to break down organic compounds to fermentation products, such as organic acids, alcohols, and carbon dioxide. Transitional bacteria (acetogenic, homoacetogenic), convert the products of the first group to acetate, hydrogen, and carbon dioxide. These reaction products are then converted to methane ($CH_4$) and carbon dioxide ($CO_2$) by methanogenic bacteria. Each group of bacteria relies on the next group to consume its products, which prohibits inhibition that occurs when excess concentrations of these compounds are allowed to develop.

The bioconversion of the organic wastes in the wastewater produces a biogas, containing methane, carbon dioxide, and hydrogen sulfide ($H_2S$). As the biogas is produced, it rises through the biomass to create channels that help prevent clogging in the system. The biogas exits through the top of the SGBR, and may then be optionally "scrubbed" to remove the $H_2S$. The biogas may be utilized in engine generators, cooking and/or refrigeration appliances, gas burners, etc. The biogas may also be further processed into vehicle fuel by removing the $CO_2$ with a membrane separation system.

Liquid effluent containing non-converted solids is drained from the reactor throughy a coarse, porous structure, such as a window screen or gravel, upon which the biomass rests. Gravel having a diameter of 2–5 mm is preferred for this purpose, as it reduces the chances of clogging. The size of the pores in the draining structure used in the SGBR should be of a size sufficient to prevent clogging in the system.

The liquid effluent produced by the SGBR has a solids content (SS) and a $BOD_5$ of 30 mg/L regardless of the HRT. Therefore, in contrast to previous wastewater treatment systems, the effluent does not require further filtering or processing, and meets NDPES permitting requirements for $BOD_5$ and SS levels.

Because of the high quality of the effluent, discharge from treatment is easily disposed. The effluent can be released into a receiving stream with no adverse effects due to the low COD and SS concentrations provided that nutrient removal is not required. Stream discharge helps both municipal and industrial sites lower treatment and processing costs. In addition, the effluent can be used as rinse water or other non-potable uses. The increased availability of non-potable water cuts down on water cost for the industry. Overall, the implementation of the SGBR is profitable for industrial and municipal facilities.

The SGBR is capable of operating as a high-rate processing system (i.e. HRT<20) since it does not require additional start-up time for the bacteria to grow. The SGBR is generally run with an HRT of from about 2–24 hours for most types of wastewater, with at least 5 hours being preferred. However, it may be preferred to use a longer HRT for medium to high strength wastewater. It may also be preferred to initially run the SGBR at a longer HRT, then shorten the HRT once the system reaches a steady state that varies according to the amount of waste in the wastewater, flow rate, etc. In this respect, and as a general guideline, the initial HRT may be twice as long as the design HRT.

The SGBR is capable of operating over a wide range of organic loadings, with a typical range of 3.2 to 32 kg/COD/$m^3$/day. The SGBR is preferably operated with an organic loading rate of up to about 20 kg/CO D/$m^3$/day.

The minimum reactor size is determined by multiplying the HRT by the flow rate. While it has been found that the SGBR will work using a wide variety of reactor sizes, shapes, and volumes, preferred reactors appear to have a larger height to width ratio.

FIG. 1 is a schematic of a preferred embodiment of the anaerobic reactor 10 described in accordance with this invention. Influent wastewater is fed from influent container 12 through feed pump 14 into bioreactor 10. The influent flows downwardly through the bed of active biomass granules that do not include a solid support 16. Wastes in the influent react with the bacteria in the granules 16 to produce biogas containing methane and carbon dioxide that exits upwardly through the bioreactor 10. The biogas optionally enters sulfide scrubber 18, then gas meter 20 and is vented to the atmosphere. Liquid effluent is drained through a stainless steel screen or gravel 22 or other porous, nonclogging medium into effluent container 24. Gas may be pumped into the bottom of the reactor using Pump 26. The reactor may further include a means for reversing the feed direction of the wastewater 28.

The following examples are offered to illustrate but not limit the invention. Thus, they are presented with the understanding that various formulation modifications as well as reactor modifications may be made and still be within the spirit of the invention.

EXAMPLE 1

Efficiency of Static Granular Bed Reactor

Reactor Set-Up

A laboratory scale anaerobic biological filter was used to carry out the experiments. The filter was made from 0.25 in. Plexiglas with a one liter working volume. Granules for the experiment were obtained from an Upflow Anaerobic Sludge Blanket (UASB) reactor.

The reactor was fed a synthetic waste of nonfat dry milk. Trace elements were added for supplemental nutrients and sodium bicarbonate was used to buffer the system. The feed was stored at 4° C. until pumped into the filter. A Masterflex pump was used to transport the feed to the reactor. A feed strength of 1000 mg/L was kept constant during the study. Effluent was also refrigerated at 4° C. until test procedures were completed.

The reactor was started at a 36 hour hydraulic residence time (HRT). Steady state for this study consisted of consistent gas production, gas composition, and chemical oxygen demand (COD) removal. Once, steady state was obtained the HRT was lowered. For this study, HRTs of 36, 24, 16, 12, and 8 hours were examined.

Testing Procedures

Chemical oxygen demand (COD), volatile fatty acids (VFA), alkalinity, pH, biological oxygen demand (BOD), and ammonia were all tested following procedures in Standard Methods for the Examination of Water and Wastewater. Gas composition was analyzed using a Gow Mac gas chromatograph.

Results

The reactor was started at an HRT of 36 hours with a feed strength of 1 g COD/L. After 34 days, the reactor was acclimated and consistently producing about 300 ml of off-gas per day. It was at this time that the HRT was lowered to 24 hours. The methane composition of the gas ranged from 70–75%, but was adjusted to 90–92%. The gas composition was adjusted to zero percent nitrogen because of diffusion of nitrogen into the gas tubing. After the HRT was lowered to 16 hours, adjustments were not made to the gas composition.

The filter maintained both total and soluble COD removal of 93% or greater after the acclimation period. The data from gas composition supports the COD destruction results using theoretical conversion of COD to methane (0.395L methane produced per 1 g COD destroyed @ 20° C.). BOD tests showed a 98% removal rate which also supports the COD data.

During the testing the effluent maintained a pH range of 6.7 to 7.1, even with a highly variable feed pH (4.0 to 6.6).

Using the titration method, VFAs were calculated to be approximately 11.5 mg/L as acetic acid. Volatile acid to alkalinity ratio was maintained below 0.1 with alkalinity values around 250 mg/L as $CaCO_3$.

EXAMPLE 2

Comparable Study of SGBRs of Different Height to Width Ratios

Reactor Set-Up

Two laboratory-scale SGBRs were observed for approximately 15 months during this study. Both were construed of 0.25 inch Plexiglas with a working volume of 1 liter. The difference between the two SGBRs was the height to width ratios of the reactors. SGBR 1 had an inner diameter of 4 inches (101 mm) and a granule height of 5.3 inches (135 mm), while SGBR 2 had an inner diameter of 2.5 inches (64 mm) and a granule height of 17 inches (432 mm). Anaerobic granules were obtained from an operating UASB.

Various HRTs were examined with a feed concentration of 1 g COD/L. The SGBRs were operated at ambient temperatures (22±20° C.).

A synthetic wastewater consisting of non-fat dry milk (NFDM) amended with sodium bicarbonate and micronutrients as shown in Tables 1 and 2 was used for the study.

TABLE 1

Feed Composition

| Component | Amount added per liter of feed |
|---|---|
| Nonfat dry milk | 1.03 g |
| Sodium bicarbonate | 0.34 g |
| Trace element solution | 0.1 ml |

TABLE 2

Trace Element Solution

| Compound | Concentration |
|---|---|
| $FeCl_2$ $4H_2O$ | 35.6 g/L |
| $ZnCl_2$ | 2.08 g/L |
| $NiCl_2$ $6H_2O$ | 4.05 g/L |
| $CoCl_2$ $6H_2O$ | 4.04 g/L |
| $MnCl_2$ $4H_2O$ | 3.61 g/L |

The reactor was fed several times per hour to attain the desired hydraulic residence time (HRT). Feed was stored at 4° C. until pumped into the reactor. A Masterflex peristaltic pump was used to transport the feed to the reactor. Effluent was refrigerated at 4° C. until analyzed.

The reactors were started at a 36 hour HRT to allow the granules to acclimate to the substrate. Once steady state was obtained the HRT was lowered. Each reactor was allowed to come to steady state independent of the other reactor. Steady state for this study was determined when consistent gas production, gas composition, and chemical oxygen demand (COD) removal were obtained. Steady state conditions were usually achieved within two months of operation at the new condition.

Set-up and operation of the reactor required minimal effort. In addition to the reactor chamber, a single feed pump was needed. (See FIG. 1). Granule acclimation to the NFDM feed source appeared to occur rapidly. The SGBR was operated in a downflow manner and the effluent flowed out by gravity. A "T" connector was used to control the liquid level in the reactor.

Only minor maintenance was needed to maintain the SGBR. Occasionally, the feed was temporarily reversed to dislodge any granules which clogged the underdrain system. A separate connection was installed to prevent the feed from contaminating the effluent tubing.

Testing Procedures

Chemical oxygen demand (COD), volatile fatty acids (VFA), alkalinity, pH, biological oxygen demand ($BOD_5$), and ammonia were tested following procedures in Standard Methods for the Examination of Water and Wastewater. Gas composition was analyzed using a Gow Mac gas chromatograph. Gas composition was measured every other week. COD, VFA, and alkalinity were tested weekly, pH was measured daily and $BOD_5$ was measured once each HRT period. Effluent samples were collected from daily composite samples, and the feed was sampled directly from the feed container.

than SGBR 1. However, the COD conversion was fairly close. Theoretical production based on the COD removed was 0.576 L $CH_4$/day and actual production was 0.434 L $CH_4$/day.

The SGBRs had excellent performance in several areas with respect to COD removals, volatile acid concentrations, and low suspended solid concentrations. Table 3 shows the operating results from both SGBRs at HRTs ranging from 36 to 5 hours. Table 4 shows the analytical results of the SGBR.

TABLE 3

Operating Characteristics of the SGBR

|  | HRT (hours) | Length operation (days) | OLR ($kg/m^3 d^{-1}$) | $CH_4$ produced (L/day) | Theoretical $CH_4$ (L/day)[1] | % of theoretical | TSS (g/L) | VSS (g/L) |
|---|---|---|---|---|---|---|---|---|
| SGBR 1 | 36 | 33 | 0.667 | 0.184 | 0.21 | 0.88 | 0.13 | 0.13 |
|  | 24 | 78 | 1 | 0.223 | 0.32 | 0.7 | 0.02 | 0.015 |
|  | 16 | 89 | 1.5 | 0.53 | 0.54 | 0.98 | 0.006 | 0.006 |
|  | 12 | 69 | 2 | 0.518 | 0.58 | 0.89 | 0.013 | 0.013 |
|  | 8 | 77 | 3 | 0.819 | 0.9 | 0.91 | 0.008 | 0.008 |
|  | 6 | 94 | 4 | 0.996 | 1.22 | 0.82 | 0.01 | 0.01 |
|  | 5 | 93 | 4.8 | 0.747 | 1.57 | 0.48 | 0.012 | 0.011 |
| SGBR 2 | 36 | 64 | 0.667 | 0.203 | 0.22 | 0.92 | 0.005 | 0.005 |
|  | 24 | 59 | 1 | 0.275 | 0.31 | 0.89 | 0.018 | 0.018 |
|  | 16 | 65 | 1.5 | 0.294 | 0.45 | 0.65 | 0.003 | 0.003 |
|  | 12 | 65 | 2 | 0.4 | 0.52 | 0.77 | 0.006 | 0.006 |
|  | 8 | 107 | 3 | 0.7 | 0.95 | 0.74 | 0.005 | 0.005 |
|  | 5 | 93 | 4.8 | 1.124 | 1.59 | 0.71 | 0.007 | 0.007 |

[1]at standard temperature and pressure

TABLE 4

Analytical Results of the SGBR

| HRT | Feed Conc. (mg COD/L) | Eff. Conc. (mg COD/L) | PH eff. | Alk (mg/L) | VFA (mg/L) as Acetic acid[2] | % $CH_4$[1] | % $CH_{21}$[1] | % BOD rem. | $H_2S$ (ppm)[3] | $NH_4$ (mg/L) |
|---|---|---|---|---|---|---|---|---|---|---|
| SGBR 1 |  |  |  |  |  |  |  |  |  |  |
| 36 | 1039.69 | 523.47 | 7.73 | 1094.2 | 24.3 | 91 | 9 |  |  |  |
| 24 | 989.07 | 45.20 | 7.16 | 535.4 | 14.3 | 76.09 | 23.91 | 98.44 | 650 |  |
| 16 | 1102.21 | 29.77 | 6.68 | 307.2 | 14.1 | 81.62 | 18.38 | 98.76 | 600 | 73.7 |
| 12 | 892.89 | 29.83 | 6.85 | 415.0 | 18.4 | 80.90 | 19.10 | 95.72 | 600 |  |
| 8 | 946.95 | 78.83 | 7.01 | 364.3 | 17.1 | 83.18 | 16.82 | 90.89 | 1800 | 70.3 |
| 6 | 948.71 | 37.55 | 7.06 | 361.5 | 18.6 | 81.08 | 18.92 | 95.87 | 1400 |  |
| 5 | 1005.10 | 59.70 | 7.05 | 435.2 | 18.6 | 67.07 | 28.10 | 96.61 | 2500 | 53.6 |
| SGBR 2 |  |  |  |  |  |  |  |  |  |  |
| 36 | 1145.18 | 51.99 | 6.89 | 299.0 | 12.2 | 81.11 | 18.89 | 99 | 1700 | 61.5 |
| 24 | 971.18 | 59.33 | 6.74 | 351.6 | 16.6 | 82.49 | 17.51 |  | 500 |  |
| 16 | 930.52 | 43.56 | 7.01 | 389.3 | 17.1 | 82.30 | 17.70 | 95.71 |  |  |
| 12 | 818.53 | 50.01 | 6.73 | 395.8 | 17.1 | 81.12 | 18.89 | 95.86 | 850 | 37.9 |
| 8 | 957.53 | 33.94 | 6.77 | 385.4 | 14.3 | 81.86 | 18.15 | 97.87 | 600 |  |
| 5 | 1152.96 | 25.22 | 6.62 | 393.8 | 11.4 | 76.05 | 19.82 | 98.1 | 1000 | 61.4 |

[1]normalized to 0% $N_2$
[2]as measured by titration. GC analysis showed NDL for acetic, proprionic, n-butyric acid
[3]in gas phase Results Both reactors were started at an HRT of 36 hours with a feed strength of 1 g COD/L. After the SGBRs showed consistent gas production and consistent COD removal (greater than 90%), the reactor was acclimated. It was at this time that the HRT was lowered to 24 hours.

SGBR 2 had a slightly longer start-up period due to the granules rising in the column because of gas build-up within the granule. After time the granules settled down into the reactor. Until the 5 hours HRT, SGBR 2 produced less gas The most notable performance was in the areas of high COD removal, high $BOD_5$ removal, and low volatile fatty acid (VFA) concentrations. Throughout the research period, both reactors maintained greater than 94% total COD removal and greater than 94% soluble COD removal. VFA concentration was measured by the titration method (Method 5560 C in Standard Methods) with an assumed efficiency of 70%. Gas chromatographic (GC) analysis, however, indicated that the titration method might have overestimated the VFA content. By GC analysis, acetic, propionic, butyric, and valeric acid concentrations were measured at or below the GC detection limit of 1 mg/L. The resulting total VFA concentration measured by GC was ≦5 mg/L.

FIGS. 2 and 3 show results for both SGBRs with HRT conditions indicated by vertical lines. Gas production increased as organic loading increased. The methane concentration was 80% or greater for most of the operating conditions in both reactors. The composition of the gas was adjusted to 0% oxygen and nitrogen to compensate for the diffusion into the gas tubing.

The SGBRs maintained both total and soluble COD removal of 93% or greater after the acclimation period. The data from the gas composition analysis supports the COD destruction using theoretical conversion of COD to methane (0.35 L methane produced per g COD destroyed@ STP). $BOD_5$ tests confirmed the high organic removal at 95% with one exception in SGBR 1.

In addition to analytical performance testing, size analysis was performed on the granules using microscopic photography. Size analysis confirmed the change in granule structure. At the start of the experiment, the majority (60%) of the granules ranged in size from 0.7 to 1 mm in diameter. Eight months later, 89% of the granules measured greater than 1.0 mm in diameter. The growth of the granules was also noticed in the volume occupied in the reactor. Granule growth benefits the reactor by increasing the number of organisms present, thereby increasing efficiency.

SGBR 2 had slightly better performance than SGBR 1. The greater bed depth gave the wastewater more chance to contact the granules and there was less short circuiting of the wastewater, the reason being that the granules aren't truly static. Because of the gas production, the granules become buoyant and move around. It was observed on several occasions that the granules were floating in the reactor. Because of different rates of gas production, the granules are continuously moving in the reactor bed.

Conclusions

Overall, the performance of the two reactors has been similar. Both reactors have exceptional performance in COD and $BOD_5$ removal, low effluent concentrations of VFAs and suspended solids. SGBR 2 has shown more consistent performance in COD removal and lower VFA concentration by titration. The long, narrow column is more representative of a plug flow reactor, making it more efficient for an anaerobic environment. In addition, SGBR 2 has a lower hydrogen sulfide concentration in the gas phase which indicates a lower number of sulfate-producing bacteria or more efficient methane-producing bacteria. In a lab setting, the larger height to width ratio performs better.

In summary:

SGBR 2 had better performance with respect to COD removals, effluent TSS concentrations, and effluent VFA concentration;

The SRT remained fairly constant despite changes in hydraulic loading;

The high turndown organic loading ration (7:1) did not affect performance even at short (5 h) HRTs;

The SGBR adjusted quickly to changes in the hydraulic and organic loading and returned to stable operation within 36 h;

The SGBR achieved higher COD removal and lower effluent TSS concentration than the ASBR in a comparison study;

SGBR achieved a long SRT (~300 days) that was unaffected by changes in hydraulic and organic loading.

Engineering Significance

The SGBR is an innovative new process that advances the anaerobic digestion field. The easy operation and simple construction make it ideal for low to medium strength wastewater as a secondary treatment device. In other anaerobic systems, start-up may take up to nine months. Start-up of the SGBR was fairly short (about 40 days), requiring little acclimation to the substrate. Once acclimated, only SGBR 1 needed minor maintenance. During the 6-hour HRT condition, the SGBR was clogged with the reactor filling with feed. Gas was first bubbled into the bottom of the reactor for about 30 seconds, enough to bubble the liquid in the reactor. Then, the feed direction was reversed for about 3 hours. This dislodged the granules and the reactor was returned to normal operation.

After eighteen months of operation, lab results show that the effluent concentration of COD was less than 80 mg/L with the exception of the start-up period in SGBR 1. SGBR 2 appeared to be the more effective reactor. It showed consistent COD removal and improved performance as the HRT was lowered. SGBR 1 had exceptional performance also but was not as reliable as SGBR 2. The larger bed depth was more efficient and did not allow short circuiting of the feed during operation.

Effluent from the SGBR was low in COD, suspended solids, and volatile acids concentrations. Throughout the study, the SGBR maintained high organic removal even as the HRT was lowered. Other studies show a significant decrease in performance as HRT is decreased.

Low suspended solids were also a significant finding compared to other systems treating wastewater with low organic concentrations. Using an ASBR, Dague et al. (1998[16]) obtained effluent SS concentrations ranging from 95 to 45 mg/L treating synthetic wastewater at various HRTs. Collins et al. (1998) obtained similar SS results as the SGBR using an EGBR. Treating primary clarifier effluent, the EGBR produced an effluent SS of less than 23 mg/L.

With low organic concentration and low SS, a facility can treat their wastewater and then reuse the effluent for cleaning or other non-potable uses. Recycling water in this manner significantly cuts sown on the amount of purchased water and thus lower costs for the facility. If a facility does not have a need to recycle the water, the effluent can be discharged with no further treatment or adverse effects on the environment.

EXAMPLE 3

Performances of the ABSR (Anaerobic Sequencing Bed Reactor) and SGBR Treating Hormel Foods Meat Processing Wastewater Materials and Methods Reactor Set-Up A laboratory-scale ASBR and SGBR system, each with a working volume of 5 L were used in this study. Both were made of cylindrical plexi-glass and each had additional headspace to accommodate granule growth and gas collection. Two sizes of gravel of approximately 10 mm and 5 mm were placed in the bottom of both reactors to retain the biomass in the SGBR and to evenly distribute the wastewater in the ASBR. For the SGBR, a T-connector was installed in the effluent line to maintain the water level at 5 L in the reactor. Seed granules were obtained from an operating UASB.

Both reactors were operated for approximately 16 months at HRTs ranging from 48–8 hours. After 155 days of operation, each of the reactors was followed by a clarifier to further improve the effluent quality. The clarifiers remained part of the system for the duration of the study but were not operated as true clarifiers. The clarifiers were periodically cleaned out, but the biosolids removed were not quantified. Effluent samples were taken from the clarifiers at a sample port near the bottom. Effluent concentrations reported may be overestimated because of this sampling procedure.

Both systems were operated at mesophilic temperature, approximately 35° C. The ASBR was operated on an 8 hr cycle at HRTs of 48 and 36 h conditions and then was changed to a 4 h cycle at HRTs of 24 and less.

Wastewater Delivery and Analysis

Drums (55 gallons) of Hormel Foods wastewater were delivered to Iowa State University from Austin, Minn. on a biweekly or weekly basis depending on the hydraulic retention time of the reactors. The drum contents were transferred to several 20 L vessels and then stored in a refrigerator at 4° C. The wastewater was fed in the top of the SGBR system on a semi-continuous basis. The ASBR was fed through the bottom of the reactor at various intervals depending on the length of the cycle. Analytical parameters (COD, suspended solids, and alkalinity) were determined twice every week using Standard Methods (APHA, 1995). The VFA concentration was measured by the titration method (Method 5560C in Standard Methods). Gas production and pH were monitored on a daily basis. Gas composition was analyzed biweekly by a GOW Mac gas chromatograph. $H_2S$ concentration in the biogas was measured by using a Drager pump and appropriate tube. The $BOD_5$ concentration was measured twice during each HRT condition. When the HRT was changed from 48 to 18 h, the OLR was changed from 0.44 to 4.58 kg $COD/m^3$/day as shown in FIG. 4.

Results and Discussion

The goal of this research was to study treatability of Hormel Foods wastewater and to compare the performances of ASBR and SGBR systems. Both systems were started at a 48 h HRT, and after steady state was achieved, the HRT was lowered gradually.

Organic Removal

During the start up period, some clogging problems occurred in the SGBR system. When the water level of the SBGR increased to more than 5 L of working volume due to clogging, it was resolved by backwashing with a peristaltic pump using the biogas produced. The clogging was easily overcome by increasing the organic loading rate and decreasing the HRT from 36 to 24 h. No clogging in the SGBR occurred after the system was changed to a 24 h HRT, most likely due to the increased gas production in the sludge bed.

As shown in FIG. 5, both reactors appeared to be at steady state after approximately one month of operation. The SGBR system was faster than the ASBR system at stabilizing the effluent COD quality at the beginning of the reactor operation. After steady state was achieved, both ASBR and SGBR systems showed good COD removal efficiencies up to the 24 h HRT condition. However, the ASBR experienced an increase in the effluent COD concentration after the change of HRT to 18 h. During the study, poor performance occurred at the initial 48 h HRT, because the granules were not acclimated to the wastewater. It was decided to return the ASBR and SGBR to a 48 h HRT condition and reevaluate the performance once the granules had been acclimated.

As shown in FIG. 6 and Table 5, throughout the research period, the SBGR maintained a COD removal efficiency in the range of 89–96% while the ASBR showed a COD removal efficiency in the range of 75–93%, with some points much lower. Over the entire study, the SGBR had more consistent COD effluent concentration. With time, the concentration gradually increased, as expected, in both systems. At HRTs less than 14 h, the ASBR had more inconsistent COD effluent concentration, most likely resulting from the increase in the effluent SS concentration, fluctuation of the effluent COD concentration of the ASBR resulted from the increase in the effluent total suspended solids (SS) concentration. The COD removal efficiency of the ASBR dropped even further to 36% when the influent SS concentration exceeded 10,000 mg/L and at a 24 h HRT. However, the effluent SGBR COD concentration remained under 150 mg/L and the COD removal was fairly constant under the same conditions. The average $BOD_5$ removal efficiencies of the ABSR and SBGR reactor were 96.6 and 98.8%, respectively. The average effluent $BOD_5$ concentrations of the ABSR and SGBR were 35±14 mg/L and 12±7 mg/L, respectively.

TABLE 5

COD Removal Efficiencies of the Two Anaerobic Treatment Systems According to HRT Conditions

| Phases | HRT (h) | Operation date | OLR KgCOD/$m^3$-day | Reactor type | COD removal efficiency (%) |
|---|---|---|---|---|---|
| I | 48 | 14–46, 89–100 | 0.44 ± 0.16 | ASBR | 83.8 ± 4.3 |
|   |    |               |             | SGBR | 89.0 ± 3.3 |
| II | 36 | 47–88 | 0.59 ± 0.12 | ASBR | 87.9 ± 2.6 |
|    |    |       |             | SGBR | 91.5 ± 2.1 |
| III | 24 | 101–142 | 1.86 ± 0.44 | ASBR | 92.8 ± 1.7 |
|     |    |         |             | SGBR | 94.9 ± 1.3 |
| IV | 18 | 142–172 | 2.15 ± 0.39 | ASBR | 89.2 ± 0.9 |
|    |    |         |             | SGBR | 94.5 ± 2.0 |
| V | 14 | 193–292 | 3.70 ± 1.18 | ASBR | 82.7 ± 14.7 |
|   |    |         |             | SGBR | 95.7 ± 1.4 |
| VI | 12 | 293–409 | 4.58 ± 1.57 | ASBR | 91.4 ± 3.4 |
|    |    |         |             | SGBR | 96.1 ± 1.9 |
| VII | 10 | 410–465 | 5.916 ± 1.824 | ASBR | 75.85 ± 8.8 |
|     |    |         |               | SGBR | 92.36 ± 1.51 |
| VIII | 8 | 466–495 | 7.233 ± 1.614 | ASBR | Failed |
|      |   |         |               | SGBR | 88.65 ± 6.76 |

The VFA concentration of the effluents in the ASBR and SGBR were 65±21 mg/L and 25±24 mg/L as acetic acid, respectively, while the influent VFA concentration was 480±180 mg/L as acetic acid. As shown in FIG. 7, the SGBR system was more stable than the ASBR system. Three points in the 12 h and 10 h HRT condition were greater than 200 mg/L and for clarity were not plotted on the graph. In addition, the SGBR system was able to adapt more rapidly than the ASBR system resulting in lower VFA concentrations in the beginning of reactor operation.

SS Removal

As shown in FIG. 8, the average influent SS concentration was 132±65 mg/L. When a 55-gallon drum arrived at Iowa State University, wastewater was transferred to a 20L tank, excluding the settled sludge in the bottom of drum. This limited the influent SS concentration, imitating what might be expected after DAF treatment. Several data points for the ASBR were greater than 500 mg/L and were not displayed on the graph. The average effluent SS concentrations of the ASBR and SGBR after settling were 143±201 mg/L and 26±16 mg/L, respectively over the course of the study. The SGBR showed an extremely low effluent SS concentration, less than 30 mg/L except for a few sample points. The reason for the periodic high concentrations of effluent SS originated from backwashing to relieve the clogging problem. However, the SS washout was easily overcome after the system stabilized compared with the ASBR. There was not a significant difference in the effluent SS concentration before and after the clarifier system was installed in the SGBR system. On the other hand, the ASBR had an effluent SS concentration more than 50 mg/L when the HRT was changed from 24 to 18 h. Decreasing the HRT from 24 h to 18 h in the ASBR increased the effluent SS concentration from 30 to 60 mg/L. The difference in the effluent SS concentration before and after settling was due to the sludge washout. It was found that the effluent SS concentration of the ASBR was 25 mg/L after settling while it was 48 mg/L before settling on 145 days of reactor operation.

Biogas Production

As shown in FIGS. 9 and 10 and Table 6, there was not a significant difference in the biogas produced between the ASBR and SGBR systems up to 24 h HRT. However, the ASBR showed a decrease in biogas production after changing the HRT from 24 h to 18 h and subsequent lowering of the HRT. It is evident that the ASBR system was less stable than the SGBR system at the higher hydraulic and organic loadings.

TABLE 6

Specific Methane Production Rate of Two Systems According to HRT Conditions

| | ASBR | | | SGBR | |
|---|---|---|---|---|---|
| HRT | Specific $CH_4$ production rate at STP (L $CH_4$/L-day) | Regression coefficient ($R^2$) | HRT | Specific $CH_4$ production rate at STP (L $CH_4$/L-day) | Regression coefficient ($R^2$) |
| 48 | 0.14 | 0.963 | 48 | 0.13 | 0.990 |
| 36 | 0.28 | 0.909 | 36 | 0.29 | 0.996 |
| 24 | 0.54 | 0.991 | 24 | 0.56 | 0.996 |
| 18 | 0.294 → 1.10* | 0.987 | 18 | 0.824 → 1.19* | 0.993 |
| 14 | 0.73 | 0.970 | 14 | 1.33 | 0.998 |
| 12 | 0.43 | 0.936 | 12 | 0.91 | 0.919 |

*Biogas production after changing the H2S scrubber in the ASBR

The specific methane production rate was determined by dividing the working volume to methane produced from reactors, which was estimated from the slope of cumulative gas production and methane content in the biogas. In addition, the methane gas produced at 35° C. was converted to the amount of gas at STP. The reason for the severe decrease in the methane production was due to the solidification of the gas outlet in the $H_2S$ scrubber, there were some problems for correct gas measurement in the ASBR. By replacing the $H_2S$ scrubber, the gas production of the ASBR was recovered to the similar amount of methane of the SGBR.

pH and Alkalinity

The pH of the ASBR and SGBR systems represented a 7.4±0.4 and 7.6±0.4 respectively. In the beginning of the study, the pH in both reactors decreased to 6.7 in the effluent. Sodium bicarbonate ($NaHCO_3$) was added in the range of 500–1,000 mg/L (250–500 mg/L of alkalinity as $CaCO_3$). The effluent pH recovered to the range of 7.5–8.0. After 45 days reactor operation, however, alkalinity was removed from the feed. It was found that the addition of alkalinity to the feed wastewater was not required after steady state was achieved. The alkalinity of the ASBR and SGBR effluents had similar concentrations ranging from 1,100–1,500 mg/L as $CaCO_3$. The influent alkalinity was in the range of 500–900 mg/L.

$H_2S$ Concentration in the Biogas

Hydrogen sulfide is an undesirable byproduct in anaerobic treatment. If the concentration of hydrogen sulfide in the biogas is over 10,000 ppm, it can cause an inhibition to the methanogens. In this research, the hydrogen sulfide concentrations of the ASBR and SGBR were 1,300–2,700 and 2,300–4,500 ppm, respectively.

Overall, the performance of the SGBR was consistent and did not vary significantly with changes in HRT conditions. The VFA and $BOD_5$ effluent concentrations were extremely low. By comparison, the ASBR operating at 18 hours showed a decrease in the COD removal efficiency and increase in the SS washout. Decreasing the HRT from 24 hours to 18 hours in the ASBR increased the effluent SS concentration from 30 to 60 mg/L. At lower HRTs, it was observed that the height of granule bed decreased in the ASBR. This loss was due to the greater decanting volumes in each cycle. In addition, one reason for the greater COD removal in the SGBR than in the ASBR was the downflow configuration in which SS are retained and subsequently degraded in the granule bed. This allowed the SGBR to have low effluent SS concentrations throughout the project.

Conclusions

The start-up time for both the ASBR and SGBR was short; less than one month. This was likely due to the use of active granular sludge as a seed biomass.

Throughout the study, the SGBR reactor produced good effluent quality; less than 30 mg/L SS and $BOD_5$ concentrations. However, the ASBR system showed slightly higher effluent SS and COD concentration than the SGBR system due to biomass washout during decanting. Both systems showed good COD removal at HRTs from 48 to 24 h. The ASBR COD removal decreased and the effluent SS concentration increased as the HRT in the ASBR was changed from 24 h to 18 h.

The SGBR is simple to construct, with few lines required to handle feed, gas, and effluent. The only mechanical part would be a feed pump, since the effluents flow out by gravity. The SGBR footprint is relatively small compared to other systems (due to the microbial density), making it ideal for a plant add-on where space could be limited. This all adds up to a system that is less expensive to build and operate.

All articles cited herein and in the following list are hereby expressly incorporated in their entirety by reference.

CITATIONS

1. Han, Y., Sung, S., Dague, R. R. (1997) Temperature Phased Anaerobic Digestion of Wastewater Sludges. Wat. Sci. Tech., 36:367–374.
2. Harris, W. L. and Dague, R. R. (1993). Comparative Performance of Anaerobic Filters at Mesophilic and Thermophilic Temperatures. Water Environment Research, 65:764–771.
3. Hulshoff Pol, L. W.; Lettinga G., Velzeboer, G. T. M; de Zeeuw, W. J. (1983). Granulation in UASB reactors. Wat. Sci. Technol., 15:291–304.
4. Orozco, A. (1997) Pilot and Full-Scale Anaerobic Treatment of Low-Strength Wastewaters at Sub-Optimal Temperature with a Hybrid Plug Flow Reactor. Proc. Of the Eighth International Symposium on Anaerobic Digestion. IAWQ, Sendai, Japan, Vol. 2:183–191.
5. Ndon, U. J. and Dague, R. R. (1997) Effects of Temperature and Hydraulic Retention Time on Anaerobic Sequencing Batch Reactor Treatment of Low-Strength Wastewater. Wat. Res., 31:2455–2466.
6. Dague, R. R.; Banik, G. C. ; Ellis, T. G. (1998) ASBR Treatment of Dilute Wastewater at Psychrophilic Temperatures. Water Environment Research, 70:155–160.
7. Collins, A. G.; Theis, T. L.; Kilambi, S.; He, L.; Paviostathis, S. G. (1998). Anaerobic Treatment of Low- Strength Domestic Wastewater Using an Anaerobic Expanded bed Reactor. J. Environ. Eng., 652–659.
8. Howerton, D. E. and Young, J. C. (1987). Two-Stage Cyclic Operation of Anaerobic Filters. Journal WPCF., 59:788–794.

For the above-stated reasons, it is submitted that the present invention accomplishes at least all of its stated objectives.

Having described the invention with reference to particular compositions and methods, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary.

What is claimed is:

1. An apparatus for purifying wastewater comprising: a reactor chamber, said reactor chamber containing a bed of active anaerobic granules, whereby the reactor chamber does not include a solid support for the bed of active anaerobic granules; and an inlet for introducing wastewater into the reactor chamber in a down-flow manner.

2. The apparatus of claim 1 further including a feed pump.

3. The apparatus of claim 1 further including a drainage system beneath the bed of active anaerobic granules to drain liquid effluent from the reactor chamber.

4. The apparatus of claim 3 whereby the drainage system supports the bed of active anaerobic granules.

5. The apparatus of claim 3 whereby the drainage system is a stainless steel screen.

6. The apparatus of claim 3 whereby the drainage system is gravel.

7. The apparatus of claim 1 further including means for reversing the feed direction of the wastewater.

8. The apparatus of claim 1 further including a pump for pumping gas into the bottom of the reactor.

9. The apparatus of claim 1 wherein the granules comprise 70–100% of the liquid in the reactor chamber.

10. The apparatus of claim 1 wherein there is a space between the granules and the top of the reactor chamber to accommodate granule growth and gas collection.

11. A method of treating wastewater comprising: downwardly feeding wastewater containing organic contaminants into a bioreactor comprising a bed of active anaerobic granules, said bioreactor not including a solid support for the bed of active anaerobic granules; and allowing the wastewater to maintain contact with the granules for a time period sufficient to reduce the level of organic contaminants in the wastewater.

12. The method of claim 11 wherein the wastewater is distributed evenly across the granules.

13. The method of claim 11 further including the step of draining liquid effluent from the bioreactor.

14. The method of claim 13 whereby the liquid effluent has a solids content of $\leq 30$ mg/L.

15. The method of claim 13 wherein the hydraulic retention time of the bioreactor is at least five hours.

16. The method of claim 11 whereby the wastewater has an organic loading of up to about 20 kg/COD/m$^3$/day.

17. The method of claim 11 whereby the wastewater has an organic loading of 0.1 to 32 kg/COD/m$^3$/day.

18. The method of claim 11 whereby biogas produced exits upwardly through the bioreactor.

19. The method of claim 18 whereby the biogas produced forms channels in the granule bed to help prevent clogging.

20. The method of claim 11 further comprising the step of occasionally reversing the flow of the wastewater to prevent clogging.

21. The method of claim 11 further comprising the step of occasionally pumping gas through the bioreactor.

22. The method of claim 11 whereby the wastewater is treated at ambient temperatures.

23. An apparatus for purifying wastewater comprising: a reactor chamber, said reactor chamber containing a bed of active anaerobic granules, whereby the reactor chamber does not include a solid support for the bed of active anaerobic granules; an inlet for introducing wastewater into the reactor chamber in a down-flow manner; and a feed pump for pumping gas into the bottom of the reactor.

24. A method of treating wastewater comprising: downwardly feeding wastewater containing organic contaminants into a bioreactor comprising a bed of active anaerobic granules, said bioreactor not including a solid support for the bed of active anaerobic granules; allowing the wastewater to maintain contact with the granules for a time period sufficient to reduce the level of organic contaminants in the wastewater; and occasionally pumping gas through the bioreactor.

* * * * *

UNITED STATES PATENT AND TRADEMARK OFFICE
CERTIFICATE OF CORRECTION

PATENT NO. : 6,709,591 B1
DATED : March 23, 2004
INVENTOR(S) : Timothy G. Ellis and Kristin F. Mach It is certified that error appears in the above-identified patent and that said Letters Patent is hereby corrected as shown below:

Column 9,
Line 2, should read -- Gas may be pumped into the bottom of the reactor using pump 26. --

Signed and Sealed this

Twenty-sixth Day of October, 2004

JON W. DUDAS
*Director of the United States Patent and Trademark Office*